United States Patent
Fitzgibbons et al.

(10) Patent No.: US 6,307,194 B1
(45) Date of Patent: Oct. 23, 2001

(54) PIXEL STRUCTURE HAVING A BOLOMETER WITH SPACED APART ABSORBER AND TRANSDUCER LAYERS AND AN ASSOCIATED FABRICATION METHOD

(75) Inventors: Eugene T. Fitzgibbons, San Clemente, CA (US); Chien-Jih Han, Plymouth, MN (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/326,937

(22) Filed: Jun. 7, 1999

(51) Int. Cl.$^7$ .................................................. H01L 27/00
(52) U.S. Cl. ........................................ 250/208.1; 250/238
(58) Field of Search ................................ 250/208.1, 216, 250/238, 214.1, 332, 338.1, 339.03, 339.04

(56) References Cited

U.S. PATENT DOCUMENTS

| | | |
|---|---|---|
| 4,063,095 | 12/1977 | Wieder . |
| 5,264,375 | 11/1993 | Bang et al. .............................. 437/3 |
| 5,286,976 | 2/1994 | Cole . |
| 5,288,649 | 2/1994 | Keenan ................................... 437/3 |
| 5,300,915 | 4/1994 | Higashi et al. . |
| 5,367,167 | 11/1994 | Keenan ............................. 250/338.4 |
| 5,585,624 | 12/1996 | Asatourian et al. ................. 250/216 |
| 5,644,838 | 7/1997 | Beratan ................................. 29/840 |
| 5,763,885 | 6/1998 | Murphy et al. ..................... 250/352 |
| 5,808,350 | 9/1998 | Jack et al. ........................... 257/440 |
| 5,811,807 | 9/1998 | Augeri et al. ....................... 250/332 |
| 5,821,598 | 10/1998 | Butler et al. ........................ 257/467 |
| 6,031,231 * | 2/2000 | Kimata et al. ....................... 250/332 |
| 6,144,030 * | 11/2000 | Ray et al. ......................... 250/338.4 |

FOREIGN PATENT DOCUMENTS

| | | | |
|---|---|---|---|
| 0859413 A2 | 8/1998 | (EP) | .............................. H01L/27/16 |
| 0859413 A3 | 1/1999 | (EP) | .............................. H01L/27/16 |

\* cited by examiner

*Primary Examiner*—Que T. Le
(74) *Attorney, Agent, or Firm*—Alston & Bird LLP

(57) ABSTRACT

A pixel structure is provided that has a substrate and a bolometer disposed upon the substrate that includes a transducer and an absorber that have been spaced apart from each other and from the substrate so as to permit the transducer and the absorber to be separately optimized. For example, the absorption characteristics of the bolometer can be maximized, while concurrently minimizing the thermal loss to the substrate. While the absorber is spaced from the transducer, the absorber is in thermal contact with the transducer such that radiation absorbed by the absorber also heats the transducer. In this regard, the bolometer also includes a thermally conductive post extending from the transducer to the absorber. Since the transducer has an electrical resistance that varies in response to changes in the temperature of the transducer, heating of the transducer in response to the absorption of radiation by the absorber causes the electrical resistance of the transducer to correspondingly vary in a predetermined manner. By measuring the change in electrical resistance of the transducer, such as by passing a known current therethrough, a precise measurement of the radiation absorbed by the absorber can be determined. In addition to the pixel structure, a method is provided for fabricating a pixel structure having a bolometer in which the transducer and absorber are spaced apart so as to likewise facilitate the independent optimization of the characteristics of both the absorber and the transducer.

19 Claims, 3 Drawing Sheets

PIXEL STRUCTURE HAVING A BOLOMETER WITH SPACED APART ABSORBER AND TRANSDUCER LAYERS AND AN ASSOCIATED FABRICATION METHOD

FIELD OF THE INVENTION

The present invention relates generally to infrared detectors and associated fabrication methods and, more particularly, to the pixel structure of a bolometer-based focal plane array and associated fabrication methods.

BACKGROUND OF THE INVENTION

Infrared detectors are used in a variety of applications to provide an electrical output which is a useful measure of the incident infrared radiation. For example, quantum detectors are one type of infrared detector that are often used for night vision purposes in a variety of military, industrial and commercial applications. Quantum detectors generally operate at cryogenic temperatures and therefore require a cryogenic cooling apparatus. As a result, quantum detectors that operate at cryogenic temperatures can have a relatively complex design and generally consume significant amounts of energy.

Another type of infrared detector is a thermal detector. Thermal detectors are typically uncooled and therefore generally operate at room temperature. One type of thermal detector that has been developed and is becoming increasingly popular is a microbolometer-based, uncooled focal plane array. A focal plane array generally includes a plurality of pixel structures, each of which include a bolometer disposed upon a common substrate. Each bolometer includes a transducer element that has an electrical resistance that varies as a result of temperature changes produced by the incident infrared radiation. By detecting changes in the electrical resistance, a measure of the incident infrared radiation can be obtained. Since the design of a bolometer-based uncooled focal plane array is generally less complex than cryogenically cooled quantum detectors and since these uncooled focal plane arrays generally require significantly less energy than cryogenically cooled quantum detectors, bolometer-based uncooled focal plane arrays are being increasingly utilized.

Each pixel structure of a conventional uncooled focal plane array has a bolometer that includes an absorber element for absorbing infrared radiation and an associated transducer element having an electrical resistance that varies as its temperature correspondingly varies. Although the absorber and transducer elements can be separate layers of a multilayer structure, the absorber element and the transducer element may sometimes be the same physical element. In operation, infrared radiation incident upon the absorber element will heat the absorber element. Since the absorber element and the transducer element are in thermal contact, the heating of the absorber element will correspondingly heat the transducer element, thereby causing the electrical resistance of the transducer element to change in a predetermined manner. By measuring the change in electrical resistance of the transducer element, such as by passing a known current through the transducer element, a measure of the incident radiation can be obtained.

In order to permit the bolometer to be responsive to changes in the incident infrared radiation, the bolometer is generally designed to minimize thermal loss to the substrate. Thus, the bolometers of conventional focal plane arrays have separated the absorber and the transducer elements from the substrate so as to substantially thermally decouple the relatively massive substrate from the pixel. In this regard, each bolometer generally includes two or more legs that support the absorber and transducer elements above the substrate. The legs can extend between the absorber and transducer elements and the substrate, or the legs can connect the absorber and transducer elements to pillars or the like that support the absorber and transducer elements above the substrate.

In order to provide thermal contact between the absorber and the transducer elements while electrically insulating the transducer element from the absorber element, the bolometer also generally includes a thermally conductive, electrically insulating layer disposed between the absorber element and the transducer element. In addition, the bolometer typically includes another insulating layer disposed on the surface of the bolometer facing the substrate which serves to structurally support the other layers and to protect the other layers during the fabrication process. See, for example, U.S. Pat. Nos. 5,286,976; 5,288,649 and 5,367,167 which describe the pixel structures of conventional bolometer-based focal plane arrays, the contents of each of which are incorporated herein by reference.

In order to further improve the performance of conventional pixel structures, each bolometer can include a reflector disposed upon the surface of the substrate underlying the absorber and transducer elements. As such, infrared radiation that is incident upon the bolometer, but that passes through and is not absorbed by the absorber element, will be reflected by the reflector back towards the absorber element. At least a portion of the reflected radiation will therefore be absorbed by the absorber element during its second pass through the absorber element, thereby increasing the percentage of the incident radiation that is absorbed by the absorber element.

In operation, infrared radiation incident upon the pixel structure will be absorbed by the absorber element of the bolometer and the heat generated by the absorbed radiation will be transferred to the transducer element. As the transducer element heats in response to the absorbed radiation, the electrical resistance of the transducer element will change in a predetermined manner. In order to monitor the change in resistance of the transducer element and, therefore, to indirectly measure the infrared radiation incident upon the bolometer of the pixel structure, circuitry is generally formed upon the underlying substrate. The circuitry is generally electrically connected to the transducer element via a pair of conductive paths or traces defined by or upon the legs, pillars or the like that support the absorber and transducer elements above the surface of the substrate. By passing a known current through the transducer element, the change in electrical resistance of the transducer element can be measured and a corresponding measure of the incident infrared radiation can be determined.

While bolometer-based focal plane arrays having a plurality of pixel structures as described above are extremely useful, these conventional focal plane arrays have several disadvantages. Most notably, for the bolometer of each pixel structure, the characteristics of the absorber element and the transducer element cannot be separately optimized since the absorber and transducer elements are included within the same multilayer structure that is supported above the surface of the substrate. In this regard, in order to optimize the performance of the bolometer of a focal plane array, the absorption characteristics of the bolometer should be maximized while the thermal loss to the substrate should be minimized. In particular, the absorption characteristics are preferably maximized and the thermal loss to the substrate is preferably minimized in order to increase the sensitivity of the bolometer. As a secondary consideration, the thermal mass is also preferably reduced in order to decrease the time constant of the bolometer. Since both the absorber element and the transducer element are included within the same multilayer structure and, in some instances, are the same physical layer, design changes made to increase the absorption characteristics of the bolometer generally also disadvantageously increase the thermal mass of the bolometer, while design changes made to decrease the thermal mass of the bolometer generally disadvantageously reduce the absorption characteristics of the bolometer. For example, increases in the size of the absorber layer of the bolometer of a conventional pixel structure that are made to increase its absorption characteristics will also disadvantageously increase the thermal mass of the bolometer. Likewise, the reduction of the thermal mass of the bolometer of a conventional pixel structure by thinning one or more layers of the bolometer will disadvantageously decrease the absorption characteristics of the bolometer.

Since the pixel structures are generally disposed in an array, it is desirable that the absorber layer of the bolometer of each pixel structure be as large as possible and approximate the overall size of the pixel structure as closely as possible in order to maximize the fill factor. Unfortunately, the legs, pillars or the like that support the absorber and transducer elements of conventional bolometer above the surface of the substrate generally extend from edge portions of the absorber and transducer elements to the substrate. Due to the design of these conventional bolometers, the absorber layer is therefore typically unable to completely cover the legs, pillars or the like.

While conventional focal plane array having pixel structures with bolometers as described above have been sufficient for most applications in the past, these conventional focal plane arrays are typically unable to meet the heightened requirements proposed by a number of future applications that demand increased performance and perhaps decreased size. In particular, as the pixel density and performance requirements of focal plane arrays are increased, the compromises that have been made in the past in order to balance the absorption characteristics, the thermal loss and the thermal mass of a conventional bolometer become unworkable. In addition, concerns relating to the costs to manufacture focal plane arrays and the size of the resulting focal plane arrays are driving focal plane arrays to be even smaller, thereby correspondingly placing even more importance upon maximizing the fill factor of the pixel structures. For the reasons described above, conventional focal plane arrays having a plurality of pixel structures, each of which includes a bolometer having both an absorber element and a transducer element supported above the surface of a substrate do not appear to be able to meet the performance requirements demanded by some modern applications.

SUMMARY OF THE INVENTION

These and other shortcomings of conventional focal plane arrays are addressed by the pixel structure of the present invention which forms one element of a focal plane array and which includes a bolometer having a transducer and an absorber that have been spaced apart so as to permit the transducer and the absorber to be separately optimized. As such, the absorption characteristics of the bolometer can be maximized, while concurrently minimizing the thermal loss to the substrate. In addition, a method is provided for fabricating a pixel structure of a bolometer-based focal plane array in which the transducer and absorber of each bolometer are spaced apart so as to likewise facilitate the independent optimization of the characteristics of both the absorber and the transducer.

According to one advantageous embodiment, each pixel structure includes a substrate and a bolometer. The bolometer includes a transducer supported in a spaced apart relationship with respect to the substrate. For example, the bolometer can include at least one leg extending between the transducer and the substrate, or between the transducer and a pillar, to support the transducer in the spaced apart relationship with respect to the substrate. The bolometer also includes an absorber supported in a spaced apart relationship with respect to both the substrate and the transducer, thereby insuring that the absorber is spaced from the transducer. While the absorber is spaced from the transducer, the absorber is in thermal contact with the transducer such that radiation absorbed by the absorber also heats the transducer. Since the transducer has an electrical resistance that varies in response to changes in the temperature of the transducer, heating of the transducer in response to the absorption of radiation by the absorber causes the electrical resistance of the transducer to correspondingly vary in a predetermined manner. By measuring the change in electrical resistance of the transducer, such as by passing a known current therethrough, a precise measurement of the radiation absorbed by the absorber can be determined.

As described, the absorber and the transducer are preferably disposed in different planes and are separated by a gap. In order to support the absorber in a spaced apart relationship from the transducer, the bolometer preferably includes a post extending between the transducer and the absorber. The post is preferably thermally conductive to thereby maintain thermal contact between the absorber and the transducer. As such, the absorber can transfer thermal energy via the post to the transducer in response to the absorbed radiation. In order to further improve the performance of the bolometer, the bolometer can also include a reflector disposed upon the substrate and underlying the transducer.

Since the absorber and the transducer are spaced apart from one another in the bolometer of the present invention, the absorber and the transducer can be separately designed in order to optimize the performance of the pixel structure. For example, in order to increase the absorption characteristics of the pixel structure, the absorber is preferably relatively large. In this regard, the absorber and the transducer are preferably sized such that the surface area of the absorber is greater than the surface area of the transducer. As such, the absorber covers the transducer in an umbrella-like configuration. Moreover, in embodiments in which the pixel structure includes at least one leg for supporting the transducer in a spaced apart relationship with respect to the substrate, the absorber is preferably sized such that the absorber covers both the transducer and the at least one leg in an umbrella-like configuration. By filling most, if not all, of the footprint of the pixel structure with the respective absorber, the focal plane array of the present invention maximizes the fill factor. In addition, by enlarging the absorber relative to the transducer, the absorber of the bolometer of the present invention will absorb more radiation and will therefor cause the transducer to be heated to a higher temperature than the bolometers of conventional pixel structures of uncooled focal plane arrays.

By spacing the absorber from the transducer, the thermal mass of the transducer can also be reduced relative to the thermal mass of the transducers of conventional bolometers. In this regard, the dimensions of the transducer can be reduced since the transducer no longer must have the same general physical size as the absorber as dictated by conventional bolometer designs. As such, the bolometer of the present invention may have a smaller time constant than conventional bolometers.

The present invention also advantageously provides a method of fabricating a pixel structure having a bolometer in which the absorber and the transducer are spaced apart from one another as described above. According to this method, a first sacrificial layer is initially deposited upon the substrate. A transducer material is then deposited upon the first sacrificial layer and a second sacrificial layer is thereafter deposited upon the transducer material. After depositing of an absorber material upon the second sacrificial layer, the first and second sacrificial layers are removed such that the transducer material and the absorber material which form the transducer and absorber, respectively, of the resulting bolometer remain in a spaced apart relationship.

In order to support the absorber in the spaced apart relationship relative to the transducer, the method of the present invention can also define an opening through the second sacrificial layer prior to depositing the absorber material thereupon. In this regard, the opening is preferably defined such that the transducer material is exposed through the opening. The opening is then filled with a thermally conductive material to thereby form a post for supporting the absorber in the spaced apart relationship relative to the transducer, while thermally coupling the absorber and the transducer.

By separating the transducer and the absorber of the bolometer of the present invention, the transducer and the absorber can be separately optimized. As such, the absorption characteristics of the bolometer can be maximized, while concurrently reducing its thermal loss to the substrate. In comparison to conventional bolometers, the bolometer of the present invention has improved absorption characteristics by absorbing a greater percentage of the incident infrared radiation and by maximizing the fill factor in a manner that is particularly advantageous for focal plane arrays including a plurality of pixel structures having reduced size relative to the pixel structures of conventional focal plane arrays. In addition, the pixel structure of the present invention permits the thermal contact from the bolometer to the substrate to be reduced, thereby increasing the response of the bolometer to incident radiation. As such, the pixel structure of the present invention offers improved sensitivity, resolution and a reduced time constant relative to the multilayer pixel structures of conventional focal plane arrays as described above.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
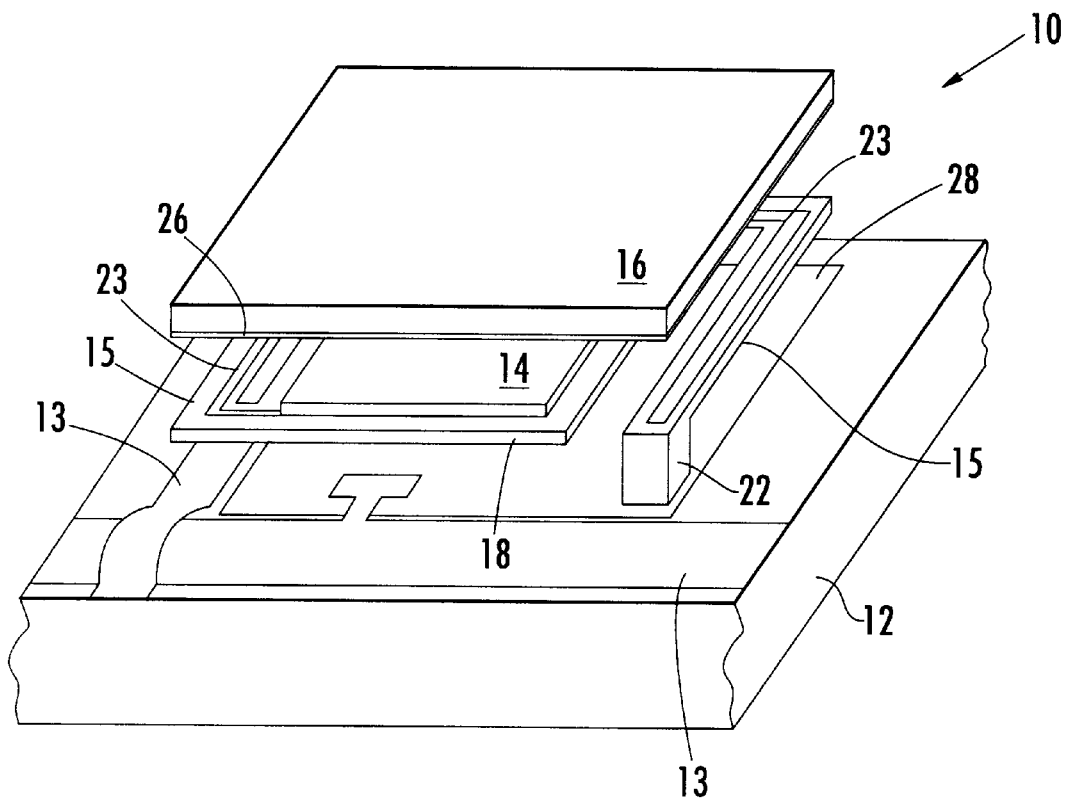
FIG. 1 is a perspective view of one pixel structure of a focal plane array according to one advantageous embodiment of the present invention.

Referring now to FIG. 1, a pixel structure 10 according to one advantageous embodiment of the present invention is illustrated. As shown, the pixel structure includes a substrate 12 and a bolometer disposed upon the substrate. As known to those skilled in the art, a focal plane array typically includes an array of pixel structures, thereby forming an uncooled infrared focal plane array. Although the array can have different sizes, such as 320 rows by 240 columns, the focal plane array of one common example includes an array of pixel structures arranged in 640 rows and 480 columns. For purposes of illustration, however, a single pixel structure is depicted with the understanding that the other pixel structures of the focal plane array can be constructed in a like fashion.

Although not illustrated, the focal plane array is typically disposed within a housing that is sealed to establish a vacuum chamber. The housing typically includes a window formed of a material that is transparent to infrared radiation such that infrared radiation incident upon the housing can be sensed by one or more pixel structures of the focal plane array. See, for example, U.S. patent application Ser. No. 09/113,472, filed Jul. 10, 1998 and entitled Sealed-Cavity Microstructure and Microbolometer and Associated Fabrication Methods that describes housings and techniques for sealing the housings in which focal plane arrays are disposed, the contents of which are incorporated herein by reference.

The substrate 12 is a microelectronic substrate and, as such, is typically formed of silicon although other materials can be utilized. Circuitry is typically formed on or below the surface of the substrate in a manner known to those skilled in the art in order to properly provide signals to and process signals that are received from the respective pixel structures, thereby permitting each pixel structure to be interrogated to determine the radiation incident thereupon. As shown in FIG. 1 in conjunction with an embodiment in which the focal plane array includes an array of pixel structures 10, the circuitry preferably includes row and column select elements 13 for permitting individual ones of the pixel structures to be addressed. As known to those skilled in the art, the circuitry can also include other circuitry disposed upon the substrate in electrical communication with the row and/or column select elements for processing the signals transmitted to or received from the respective pixel structure.

The bolometer includes a reflector 28 disposed upon the substrate 12 in a location underlying at least a portion of the absorber 16, as described hereinafter. For example, after the circuitry has been formed upon the substrate 12, such as upon receipt of the substrate from an IC foundry, a layer of metal is patterned on the surface to be the reflector. This layer defines the bottom side of the optical cavity for absorption. The top side of the cavity is defined by the absorber layer which is formed later in the fabrication process and will be described hereinafter. The reflector may be formed from a variety of materials, including aluminum in one advantageous embodiment.

As shown in FIG. 1, the pixel structure 10 of the focal plane array of the present invention includes a transducer 14 supported in a spaced apart relationship with respect to the substrate 12 and an absorber 16 supported in a spaced apart relationship with respect to both the substrate and the transducer. Since the absorber is spaced from the transducer, the characteristics of the transducer and the absorber can be individually optimized. For example, the absorption characteristics of the absorber can be maximized in order to increase the responsiveness of the respective pixel structure.

The transducer 14 is formed of a material having an electrical resistance that varies in response to changes in its temperature. For example, the transducer of one advantageous embodiment is formed of vanadium oxide $VO_x$ since vanadium oxide has an electrical resistance that predictably varies in a significant manner in response to changes in its temperature. Typically, the transducer is disposed upon an insulating layer 18 that serve to protect and support the transducer. While the material that forms the insulating layer is electrically insulating, the material is also preferably selected and the insulating layer is preferably shaped so as to assist in thermally isolating the transducer from the substrate 12, thereby reducing the thermal loss to the substrate. For example, the insulating layer is typically formed of silicon dioxide $SiO_2$ that is shaped to define a pair of legs 15 having a meandering pattern in order to increase the thermal isolation of the transducer, as described below. However, the insulating layer can be formed of other electrically insulating materials without departing from the spirit and scope of the present invention. Although not illustrated, the transducer can also be covered with another insulating layer in order to further protect the transducer. Like the supporting insulating layer, the insulating layer that covers the transducer is preferably formed of an electrically insulating material that is preferably selected and shaped to be relatively thermally insulating, such as $SiO_2$. For purposes of description, the transducer element as well as the surrounding insulating layers will collectively be referenced as the transducer layer 20.

Figure 2:
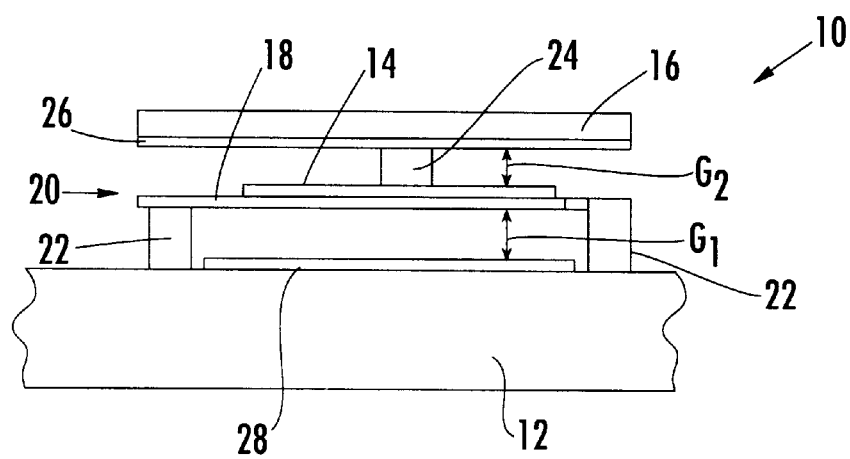
FIG. 2 is a side elevational view of the pixel structure of FIG. 1.

As shown in FIG. 2, the transducer layer 20 is spaced from the underlying substrate 12, typically by a gap $G_1$. While the gap can have different sizes without departing from the spirit and scope of the present invention, the gap is typically about 1 micron. In particular, the gap is typically sized so that when combined with the second gap $G_2$ the total distance is about one quarter of the wavelength of radiation that the bolometer is designed to detect, as described in more detail below The transducer layer 20 can be spaced from the substrate 12 in a variety of manners. For example, the insulating layer can include a pair of legs that are angled or sloped downwardly to the substrate. Alternatively, the legs 15 of the bolometer of the illustrated embodiment extend to respective pillars 22 that extend outwardly in an orthogonal manner from the substrate so as to support the transducer layer above the substrate. Like the transducer layer, the pillars are typically a composite structure formed of an electrically conductive material, such as chromium or nichrome, extending through an electrically insulating material, such as $SiO_2$, in order to provide electrical contact between the transducer element and circuitry disposed upon the substrate, as described in more detail below. By thermally isolating the transducer element from the substrate, the thermal loss from the bolometer to the substrate is reduced.

The bolometer further includes conductive traces 23 that extend from the transducer element 14 to respective ones of the pillars 22 and, more particularly, to the electrically conductive portion of each pillar, thereby electrically connecting the transducer element to the circuitry disposed upon the substrate 12. As described above in conjunction with the transducer element, the conductive traces are generally deposited upon the insulating layer 18 and, although not illustrated, the conductive traces can also be covered with another insulating layer in order to protect the conductive traces and the signals propagating therealong. As described below, the conductive traces are more preferably deposited upon the meandering legs 15 of the insulating layer in order to extend from the transducer element to the respective pillars. As explained below, the circuitry can therefore be controlled to pass current through the transducer element such that the resistance of the transducer element can be correspondingly monitored, thereby providing a measure of the radiation incident upon the bolometer.

Figure 4:
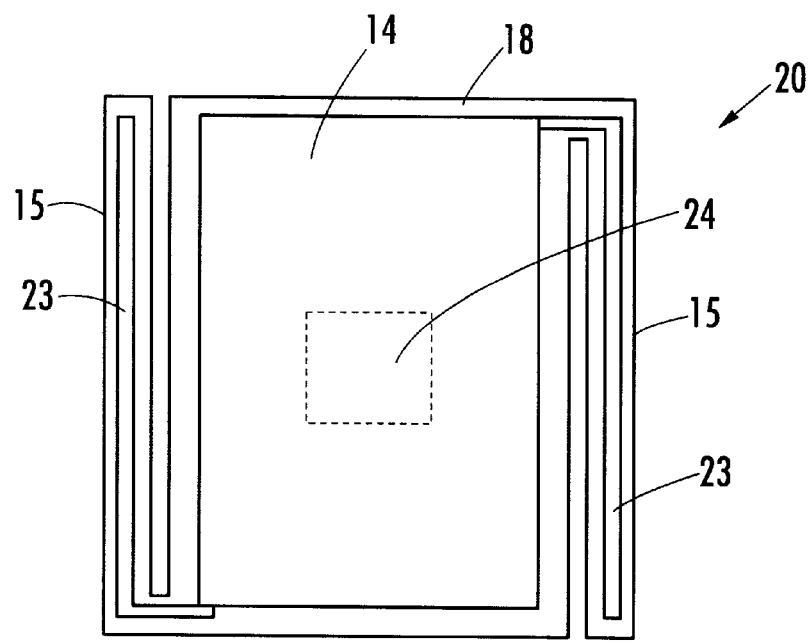
FIG. 4 is a plan view of the transducer and the associated legs of the bolometer of the pixel structure of FIG. 1.

In order to minimize the thermal loss from the transducer element 14 to the substrate 12 and to correspondingly maximize the responsiveness of the bolometer, the transducer element is preferably thermally isolated from the underlying substrate 12. In order to provide thermal isolation, the insulating layer 18 that supports the transducer element preferably has legs 15 that define a meandering pattern between the transducer element and the respective pillars 22. See FIG. 4. In this regard, although the insulating layer of the illustrated embodiment includes a pair of generally L-shaped legs, the insulating layer can define more intricate and sinuous meander patterns, if so desired. As will be apparent to those skilled in the art, the meandering pattern of the legs will provide significant thermal isolation for the transducer element 14 since the length of the path that heat must traverse to pass between the transducer element and the substrate is much greater than the cross-sectional size of the path, i.e., the length of the legs is much greater than the cross-sectional dimensions of the legs.

In addition, in order to decrease the thermal mass of the transducer, the size of the transducer is preferably reduced relative to the size of the absorber 16. As such, the transducer is typically significantly smaller than the underlying insulating layer 18 as shown in FIG. 2. The transducer is therefore generally positioned upon a medial portion of the insulating layer from which the legs 15 extend.

According to the present invention, the bolometer of the pixel structure 10 also includes an absorber 16 spaced from, but in thermal contact with the transducer 14 such that radiation absorbed by the absorber heats both the absorber and the transducer, thereby causing the electrical resistance of the transducer element to correspondingly vary. The absorber is preferably formed of the material that is strongly absorptive of radiation of the wavelength range of interest, such as infrared radiation having a wavelength of 8 to 12 microns. In addition, the absorber is preferably formed of a material that is relatively lightweight, stiff and electrically inactive. As such, the absorber of one advantageous embodiment is formed of silicon nitride. However, the absorber can be formed of other materials without departing from the spirit and scope of the present invention.

Figure 3:
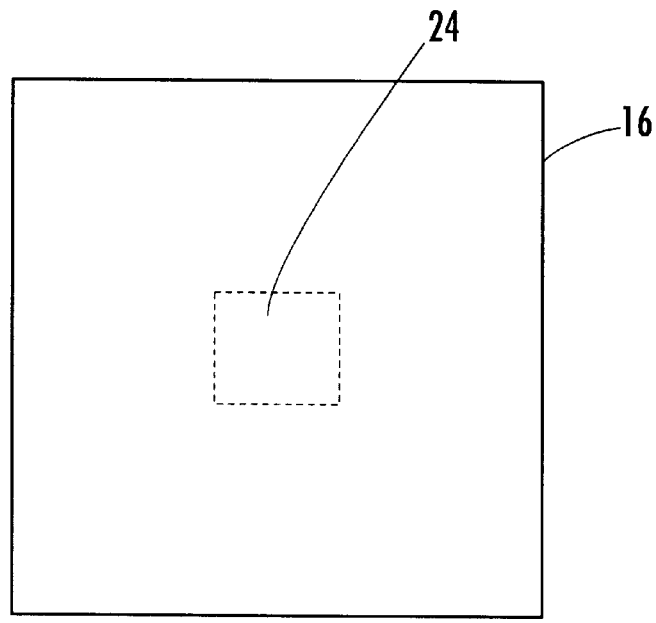
FIG. 3 is a plan view of the absorber of the bolometer of the pixel structure of FIG. 1.

The absorber 16 is typically spaced from the transducer layer 20 by means of one or more posts 24. As shown in FIGS. 2 and 3, for example, the bolometer can include a single post extending outwardly from the transducer element 14 in order to support a central portion of the absorber in a spaced apart relationship with respect to the transducer layer. However, the bolometer can include additional posts, if so desired. In order to maintain the absorber and the transducer element in thermal contact, the post is thermally conductive. For example, the post can be formed of silicon dioxide $SiO_2$. While silicon dioxide is the same material that typically forms the insulating layer 18, the post has a size and shape that permits heat to be efficiently transferred from the absorber to the transducer element while the legs 15 of the insulating layer have a size and shape that effectively limits heat transmission between the transducer element and the substrate 12. In this regard, the length of the post is generally much smaller than the width of the post such that the post is quite thermally conductive. For example, while the post can have a variety of sizes, the post of one advantageous embodiment has a length of about 1 micron while the width of the post is about 4 to 5 microns. In contrast, the length of each leg of the insulating layer is many times greater than the respective width. While multiple posts can be utilized to support the absorber in a spaced apart relationship with respect to the transducer layer, the overall thermal mass of the post(s) is preferably relatively small with respect to the absorber and the transducer in order to permit the time constant of the bolometer to also be relatively small.

As described above with respect to the spacing of the transducer layer 20 from the underlying substrate 12, the absorber 16 can be spaced at a number of distances from the transducer layer. In one advantageous embodiment, however, the absorber is spaced by a gap $G_2$ of about 1 micron from the transducer layer. See FIG. 2. More particularly, the combined thickness of the two gaps, $G_1+G_2$ has a combined spacing at about a quarter of the wavelength of the radiation that the absorber is designed to preferentially absorb, such as about 2 to 3 microns for an absorber designed to preferentially absorb infrared radiation having a wavelength of 8 to 12 microns.

Although not necessary for the practice of the invention, the bolometer can also include an absorption enhancement layer 26 disposed upon the backside of the absorber 16, that is, the surface of the absorber that is opposite the surface upon which the radiation is incident. See FIG. 2. The absorption enhancement layer is designed to match the impedance of free space so as to minimize reflection. This layer may be formed of a variety of materials including vanadium in one advantageous embodiment. The absorption enhancement layer 26 and the absorber 16 are hereinafter collectively referred to as the absorber layer. As shown, the absorber layer and the reflector 28 on the substrate 12 cooperate to define a resonant optical cavity that can be sized to optimize absorption of radiation in the desired wavelengths.

In operation, radiation, such as IR radiation having a wavelength of 8 to 12 microns, that is incident upon the absorber 16 causes the temperature of the absorber to increase. This increased temperature is transmitted via the post 24 to the transducer element 14 since the absorber and the transducer element are in thermal contact. As such, the temperature of the transducer element increases and the electrical resistance of the transducer element is correspondingly altered. Current can then be passed through the transducer element via the circuitry disposed upon the substrate and the conductive traces that extend between respective portions of the circuitry and the transducer element. In a typical embodiment of a focal plane array in which the circuitry includes row select elements and column select elements 13, a known voltage can be applied to the row select element in order to induce current to flow through each pixel structure in the selected row. By measuring the changes in electrical resistance of the transducer element, the circuitry or other associated processing elements can precisely determine the radiation incident upon the absorber. For example, by separately measuring the current flowing through the transducers of the bolometers of the selected row of pixel structures and by adjusting the measured current by a predefined offset to compensate for differences between the bolometers, a measure of the resistance of the respective transducer layers and, in turn, a measure of the radiation incident upon the respective absorbers can be obtained. By analyzing the radiation incident upon each of an array of pixel structures, a two-dimensional image of the incident radiation can be constructed.

Since the bolometer of the pixel structure 10 of the present invention separates the absorber 16 and a transducer element 14 as described above, the absorber can be constructed to maximize its absorption characteristics while simultaneously minimizing the thermal loss to the substrate in order to correspondingly increase the responsiveness of the bolometer. As such, even though the absorber is typically relatively thin, such as about 2,000 angstroms or less, the absorber is generally constructed to have a relatively large surface area for receiving the radiation. As shown in FIG. 2 for example, the absorber and the transducer are preferably sized such that the surface area of the absorber is greater than the surface area of the transducer element. In one embodiment, for example, the absorber is 49 microns square while the transducer is much smaller, such as 10 or 15 microns square. As such, the absorber covers the transducer in an umbrella-like configuration. More particularly, the absorber preferably covers the entire transducer layer and the legs 15 and pillars 22 that suspend the transducer layer above the substrate 12 in an umbrella-like configuration. By enlarging the dimensions of the absorber relative to the transducer layer, the array of pixel structures of the present invention can be designed to advantageously maximize the fill factor. Since the relative sizes of the absorber and the transducer element can be separately designed, the pixel structure of the present invention can also be utilized to fabricate focal plane arrays having pixel structures that are smaller than a conventional pixel structure that is 49 microns square. For example, the pixel structures of the present invention can be 30 microns square or even smaller, thereby permitting more pixel structures to be fabricated from a wafer of a given size. In addition, the thermal mass of the transducer can be minimized without concern that the absorption characteristics of the absorber are being correspondingly reduced as in conventional focal plane array designs. As such, the time constant of the resulting pixel structure can be designed to be relatively small.

Figure 5:
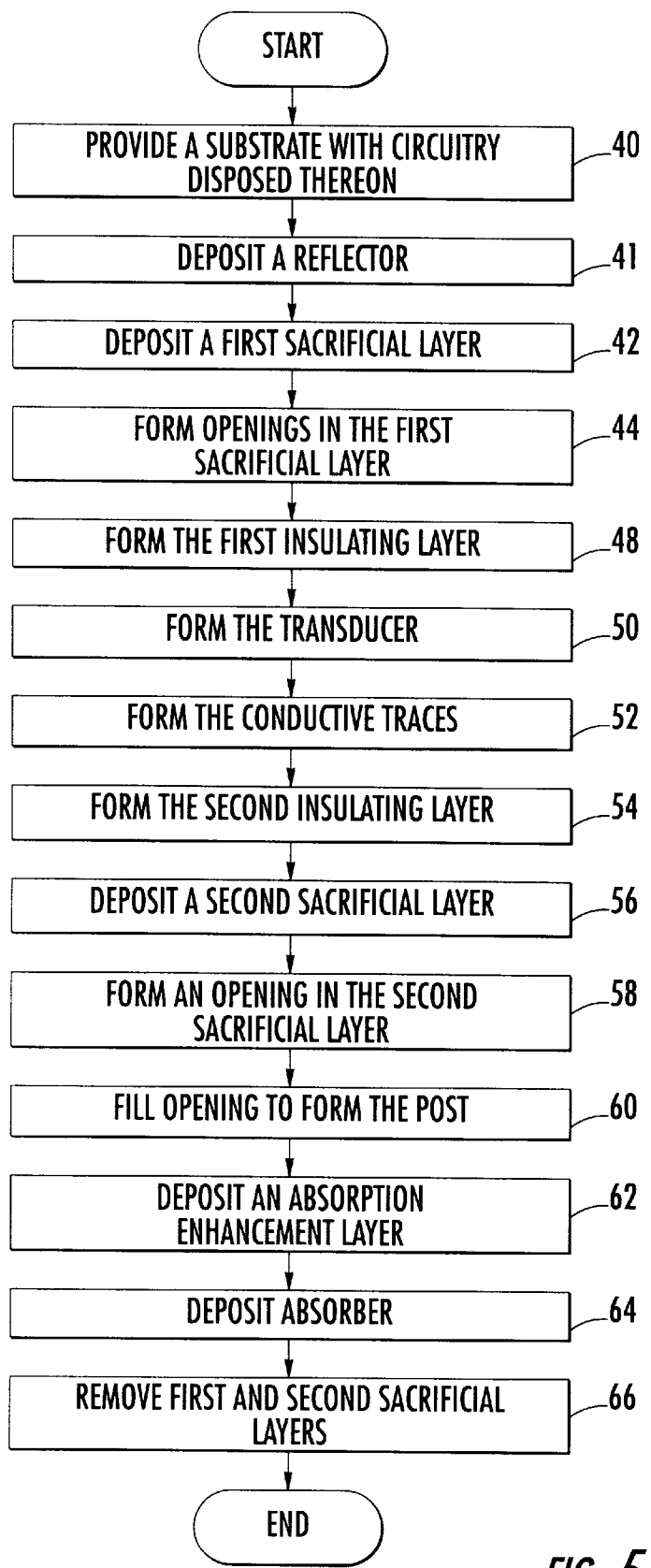
FIG. 5 is a flow chart illustrating the operations performed to fabricate the pixel structure having a bolometer according to one embodiment of the present invention.

As shown in FIG. 5, the pixel structure 10 of the present invention is typically fabricated by a unique series of conventional microelectronic fabrication steps. In this regard, a substrate 12 having circuitry formed thereon is provided as shown in block 40. A reflector 28 is initially formed by depositing a layer of reflective material, such as aluminum. See block 41. A first sacrificial layer is then deposited upon the substrate and the reflector layer. See block 42. While the first sacrificial layer can be formed of a variety of materials, the first sacrificial layer is typically formed of a polyimide. Since the first sacrificial layer will define the gap $G_1$ between the substrate and the transducer layer 20, the first sacrificial layer typically has a thickness of about 1 micron as described above. After photolithographically patterning the first sacrificial layer, the first sacrificial layer is etched to define at least one and, more typically, a pair of openings through which the substrate is exposed such that electrical contact can subsequently be made with the circuitry carried by the substrate, as described below. See block 44. An insulating layer 18 is then deposited upon the first sacrificial layer and within the openings defined by the first sacrificial layer as shown in block 48. In this regard, the insulating layer is typically deposited by plasma enhanced chemical vapor deposition (PECVD) and is thereafter photolithographically patterned to define the desired shape, i.e., to define the medial portion and the meandering legs 15. While photolithographically patterning the insulating layer, openings are also preferably defined through the insulating material that has been deposited within the openings defined by the first sacrificial layer such that the substrate and, more particularly, circuitry on the substrate is again exposed. The transducer element 14 is then deposited upon the insulating layer, such as by depositing vanadium oxide by reactive sputtering. See block 50. After photolithographically patterning the transducer element, the conductive traces can be deposited, such as by sputtering an electrically conductive material such as chromium or nichrome, upon the legs of the insulating layer and within the openings defined through the insulating layer to the underlying substrate. As such, the conductive traces make electrical contact with the circuitry disposed upon the substrate that is exposed within the opening. See block 52. After photolithographically patterning the conductive traces, the second insulating layer can be deposited, such as by PECVD, and photolithographically patterned as shown in block 54.

A second sacrificial layer is then deposited upon the transducer layer 20. See block 56. As described above, the second sacrificial layer is typically comprised of polyimide having a thickness of 1 micron, although a variety of other materials having a number of different thicknesses can be utilized. The second sacrificial layer is then photolithographically patterned and etched to form at least one opening through which the transducer layer 20 is exposed. See block 58. The opening is then filled with a thermally conductive material, such as silicon dioxide that is generally deposited by PECVD in order to form the post 24. See block 60. Absorption enhancement layer 26 can then be deposited upon the second sacrificial layer and photolithographically patterned as desired. For example, the absorption enhancement layer can be formed of vanadium that is sputtered onto the second sacrificial layer. See block 62. Finally, the absorber can be deposited upon the absorption enhancement layer and thereafter photolithographically patterned to form the desired shape. By way of example, silicon nitride can be deposited by sputtering in order to form the absorber. See block 64. The first and second sacrificial layers are then removed, such as by oxygen plasma etching that converts the polyimide into carbon dioxide. See block 66.

As such, the pixel structure 10 of the present invention can be efficiently fabricated by a unique combination of microelectronic fabrication steps. In addition, by separating the absorber 16 and the transducer element 14, the absorber and the transducer element can be separately optimized, such as by enhancing the absorption characteristics of the absorber and minimizing the thermal loss to the substrate, thereby maximizing the responsiveness of the pixel structure. Accordingly, the pixel structure of the bolometer-based uncooled focal plane array of the present invention can provide a precise measure of the radiation incident upon the absorber in a timely and responsive manner.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A pixel structure of a bolometer-based focal plane array for preferentially detecting radiation of a predetermined wavelength comprising:
    a substrate; and
    a bolometer comprising:
        a transducer supported in a spaced apart relationship with respect to said substrate to define a first there between, said transducer having an electrical resistance that varies in response to changes in the temperature of said transducer; and
        an absorber supported in a spaced apart relationship with respect to both said substrate and said transducer to thereby define a second gap between said absorber and said transducer, said absorber being in thermal contact with said transducer, thereby permitting radiation absorbed by said absorber to heat said transducer and cause the electrical resistance of said transducer to correspondingly vary,
    wherein a combined thickness of the first and second gaps has a predefined relationship to the predetermined wavelength of radiation that the pixel structure preferentially detects.

2. A pixel structure according to claim 1 wherein said bolometer further comprises a post extending between said transducer and said absorber for supporting said absorber in a spaced apart relationship with respect to said transducer, said post being thermally conductive to thereby establish thermal contact between said absorber and said transducer.

3. A pixel structure according to claim 1 wherein said absorber and said transducer have respective surface areas, and wherein the surface area of said absorber is greater than the surface area of said transducer.

4. A pixel structure according to claim 3 wherein said absorber covers said transducer in an umbrella-like configuration.

5. A pixel structure according to claim 1 wherein the combined thickness of the first and second gaps is a quarter of the predetermined wavelength of radiation that the pixel structure preferentially detects.

6. A pixel structure according to claim 1 wherein said bolometer further comprises a reflector disposed upon said substrate underlying said transducer.

7. A pixel structure according to claim 6 wherein said reflector and said absorber define an optical cavity having a length that is selected so as to tune said bolometer to detect radiation of a predetermined wavelength.

8. A pixel structure according to claim 1 wherein said bolometer further comprises at least one leg extending between said transducer and said substrate to support said transducer in the spaced apart relationship with respect to said substrate.

9. A pixel structure according to claim 8 wherein said absorber covers both said transducer and said at least one leg in an umbrella-like configuration.

10. A pixel structure comprising:
    a substrate; and
    a bolometer comprising:
        a transducer supported in a spaced apart relationship with respect to said substrate, said transducer having an electrical resistance that varies in response to changes in the temperature of said transducer;
        a post extending outwardly from said transducer in a direction away from said substrate, said post being thermally conductive;
        an absorber supported upon said post over said transducer, said absorber adapted to absorb radiation and to transfer thermal energy via said post to said transducer in response to the absorbed radiation, thereby causing the electrical resistance of said transducer to correspondingly vary; and an absorption enhancement layer disposed on said absorber in a facing relationship with said transducer, said absorption enhancement layer having an impedance that matches an impedance of free space.

11. A pixel structure according to claim 10 wherein said absorber and said transducer have respective surface areas, wherein the surface area of said absorber is greater than the surface area of said transducer, and wherein said absorber covers said transducer in an umbrella-like configuration.

12. A pixel structure according to claim 10 wherein said absorber and said transducer are disposed in respective planes and are separated by a gap.

13. A pixel structure according to claim 10 wherein said bolometer further comprises a reflector upon said substrate underlying said transducer.

14. A pixel structure according to claim 13 wherein said reflector and said absorber define an optical cavity having a length that is selected so as to tune said bolometer to detect radiation of a predetermined wavelength.

15. A pixel structure according to claim 10 wherein said bolometer further comprises at least one leg extending between said transducer and said substrate to support said transducer in a spaced apart relationship with respect to said substrate.

16. A pixel structure according to claim 15 wherein said absorber covers both said transducer and said at least one leg in an umbrella-like configuration.

17. A method of fabricating a pixel structure for preferentially detecting radiation having a predetermined wavelength comprising:

depositing a first sacrificial layer upon a substrate having a first thickness;

depositing a transducer material upon said first sacrificial layer, wherein the transducer material has an electrical resistance that varies in response to changes in the temperature of the transducer material;

depositing a second sacrificial layer upon the transducer material having a second thickness;

depositing an absorber material upon the second sacrificial layer, wherein the absorber material is adapted to absorb radiation and to correspondingly increase in temperature; and removing the first and second sacrificial layers to thereby space the transducer material and the absorber material apart from one another, wherein depositing the first and second sacrificial layers is preceded by selecting the first and second thicknesses such that the combined thickness has a predefined relationship to the predetermined wavelength of radiation that the pixel structure preferentially detects.

18. A method according to claim 17 further comprising:

defining an opening through the second sacrificial layer, prior to depositing the absorber material; and filling the opening with a thermally conductive material to thereby form a post for supporting the absorber material in a spaced apart relationship with respect to the transducer material.

19. A method of fabricating a pixel structure comprising:

depositing a first sacrificial layer upon a substrate;

depositing a transducer material upon said first sacrificial layer, wherein the transducer material has an electrical resistance that varies in response to changes in the temperature of the transducer material;

depositing a second sacrificial layer upon the transducer material;

depositing an absorption enhancement layer upon the second sacrificial layer that has an impedance that matches an impedance of free space;

depositing an absorber material upon the absorption enhancement layer, wherein the absorber material is adapted to absorb radiation and to correspondingly increase in temperature; and removing the first and second sacrificial layers such that the transducer material and the absorber material are spaced apart from one another.

\* \* \* \* \*

UNITED STATES PATENT AND TRADEMARK OFFICE
CERTIFICATE OF CORRECTION

PATENT NO. : 6,307,194 B1
DATED : October 23, 2001
INVENTOR(S) : Fitzgibbons et al.

It is certified that error appears in the above-identified patent and that said Letters Patent is hereby corrected as shown below:

Column 12,
Line 8, after "first" insert -- gap --.

Signed and Sealed this

Eleventh Day of June, 2002

Attest:

Attesting Officer

JAMES E. ROGAN
*Director of the United States Patent and Trademark Office*